July 2, 1957  H. M. TAFT  2,797,496

THREAD FORM AND PITCH DIAMETER GAGES

Filed July 20, 1954  3 Sheets-Sheet 1

INVENTOR.
Hugh M Taft
BY Martin Kilpatrick
Atty

July 2, 1957 H. M. TAFT 2,797,496
THREAD FORM AND PITCH DIAMETER GAGES
Filed July 20, 1954 3 Sheets-Sheet 2

INVENTOR.
Hugh M Taft
BY Martin Kilpatrick
Atty

July 2, 1957

H. M. TAFT 2,797,496

THREAD FORM AND PITCH DIAMETER GAGES

Filed July 20, 1954

INVENTOR.
Hugh M Taft
BY Martin Kirkpatrick
Atty

United States Patent Office 2,797,496
Patented July 2, 1957

2,797,496

THREAD FORM AND PITCH DIAMETER GAGES

Hugh M. Taft, Springfield, Vt., assignor to Bryant Chucking Grinder Company, Springfield, Vt., a corporation of Vermont Application July 20, 1954, Serial No. 444,411

13 Claims. (Cl. 33—199)

This invention relates to gages for threaded workpieces and particularly to gages for the simultaneous gaging of both the thread form and pitch diameter of threaded workpieces.

With threaded workpieces, the usual gaging operation consists in measuring the overall size thereof in order to determine whether or not a given workpiece is within a predetermined tolerance for assembly with its mating part, such measurement commonly being made by a gage having a pair of relatively movable threaded gage elements which serve to engage the workpiece and measure its departure from a standard size.

Although such gage elements, by virtue of their each having several threads for engaging with a workpiece, serve as a practical matter to determine the "assemblability" of workpieces by an overall indication of the thread form (by which term I intend to include both thread lead and cross-sectional configuration) of such workpieces, they do not in many instances serve to distinguish between thread form errors and thread pitch diameter errors, since thread form errors in an externally threaded workpiece, for example, produce an overall gage indication that apparently indicates a larger thread pitch diameter than is actually the case. Hence, it is frequently found to be essential to determine the pitch diameter of a threaded workpiece as well as the overall thread form so that thread errors may be properly classified for their correction.

Heretofore, however, such pitch diameter gaging has been carried out by entirely separate gaging means which, as a practical matter, precluded any direct comparison of thread form and pitch diameter measurements, particularly at any given point along the length of a threaded workpiece, so that complete information as to the size of such workpiece was not readily available.

Accordingly, it is an object of the present invention to provide a novel thread gage having provision for the simultaneous gaging of both thread form and pitch diameter so that a more complete functional thread inspection may be performed in one gaging operation.

It is a feature of the invention that indications of both thread form and pitch diameter may be made to appear simultaneously on, for example, two micrometer dial indicators, so that comparisons may readily be made between thread form and pitch diameter at any desired point along the length of a workpiece.

Other objects and features of the invention will be apparent from the following description of a preferred embodiment thereof together with the accompanying drawings, in which.

Figs. 4, 5, 6, and 7 are diagrammatic views of a thread gage of the invention showing simultaneous thread form and pitch diameter measurements for a variety of workpiece thread form and pitch diameter conditions.

Figure 1:
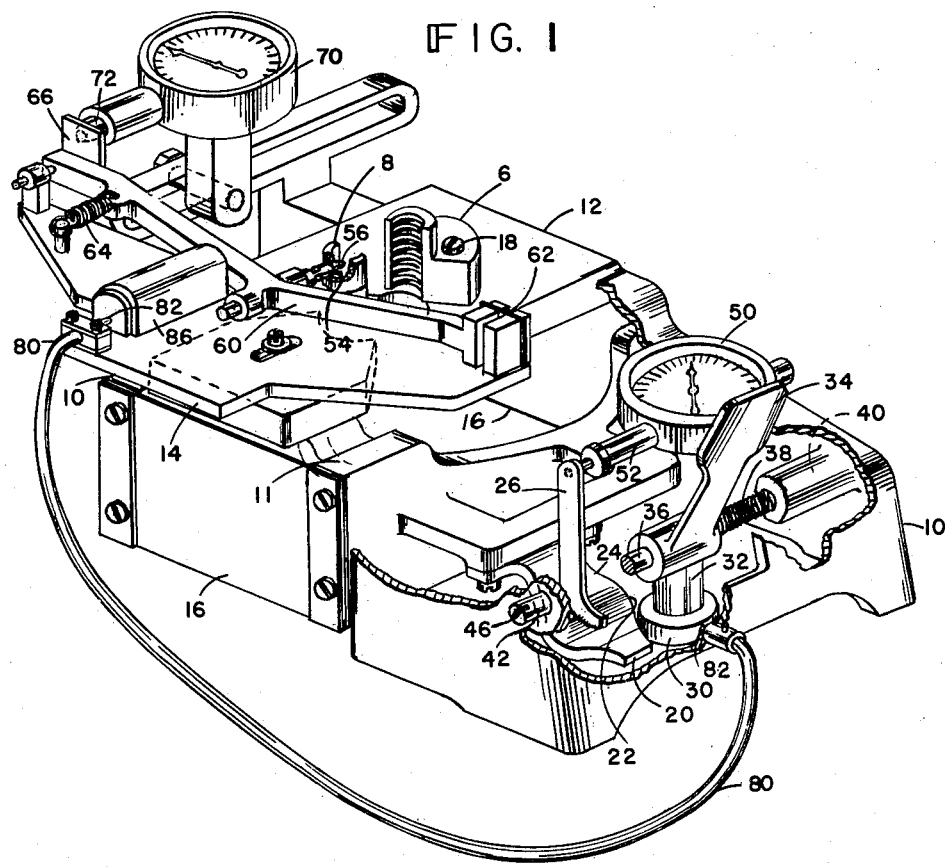
Fig. 1 is an isometric view of a thread gage of the invention.
Figure 3:
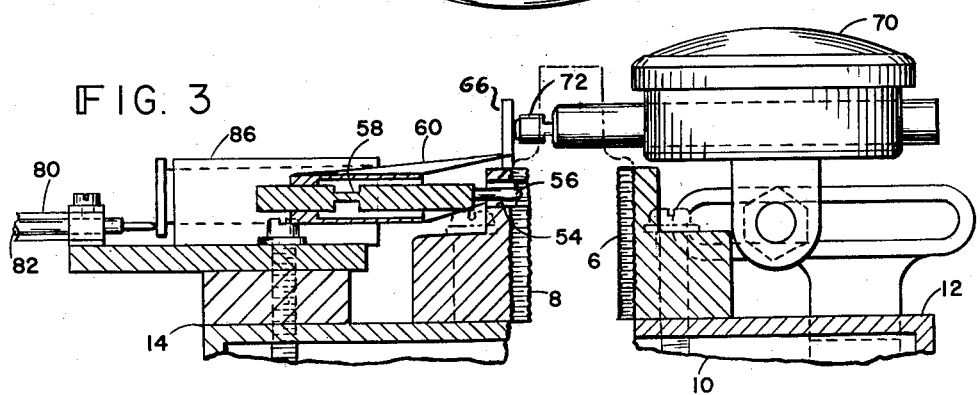
Fig. 3 is a partial front elevational view of the gage of Fig. 1.
Figure 2:
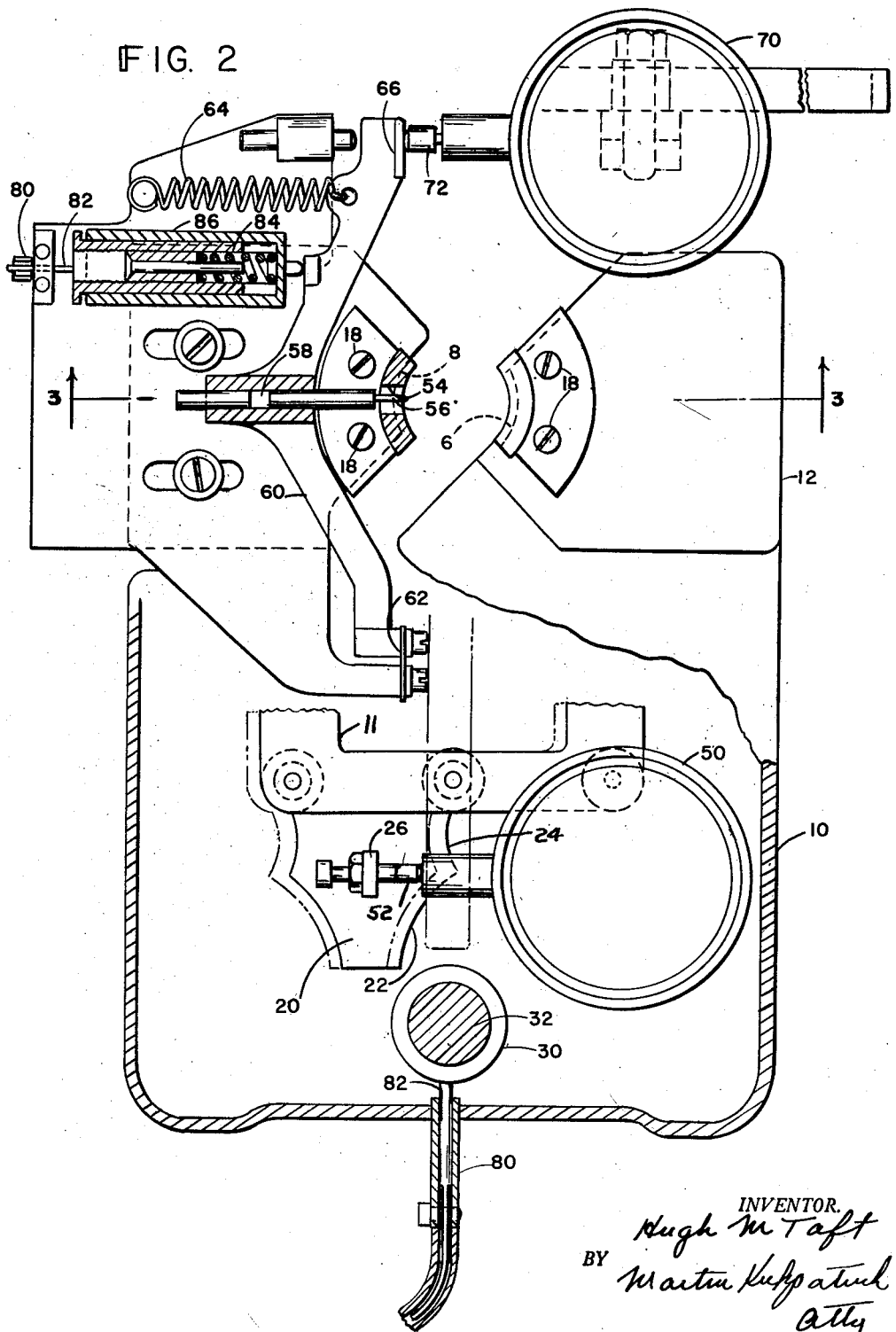
Fig. 2 is a plan view of the gage of Fig. 1.

Referring to Figs. 1, 2 and 3, the gage of this invention includes a main fixed frame 10 and a movable sub frame 11 each carrying a gage element supporting member and being connected together by a pair of spaced parallel reeds 16 for relative movement. Each of the reeds 16 is secured at one end to the main fixed frame 10 and at the other end to the movable subframe 11 and they extend generally along said frame 10 on opposite sides thereof. The reeds 16 are of substantial width, thus to provide a rigid and secure structure affording substantial resistance to relative motion of the members in a direction parallel to the plane of the reeds, but permitting the members to be moved relatively to one another in either direction from their neutral position in a single plane perpendicular to that of the reeds, and in a substantially rectilinear direction. Said reeds 16 may act both as the sole support for said movable frame 11 and also as the sole means to urge said supporting members into gaging position, such gaging position normally being slightly displaced from the neutral position of the reeds, to provide the requisite gaging pressure, or an additional spring means may be provided, if desired, and in this latter case the reeds may be positioned in their neutral position during gaging.

On the upper portions of the fixed frame 10 and movable sub frame 11 are provided gage element supporting members 12 and 14, respectively, such members having relatively flat upper surfaces adapted to support suitable thread form gage elements 6 and 8, said gage elements being mounted on said members by machine screws 18 fitting into tapped holes in said support members. Since the gage shown in Figs. 1 through 3 is intended for external thread gaging, gage elements 6 and 8 have their shank portions internally threaded with a plurality of threads for gaging engagement with a plurality of the external threads of a workpiece. Other gage elements may readily be substituted by the removal of screws 18.

The movable subframe 11 carrying gage element supporting member 14 is provided with camming means carried thereby and interposed between said movable member and frame 10 to urge the thread form gage elements 6 and 8 mounted on the supporting members into non-gaging position, and to retain them in such position until released. Such camming means includes a curved cam member 20 mounted on movable supporting member 14 and having on one side thereof a cam surface 22 slanted outwardly and rearwardly away from the center line of said cam, and a cam follower in the form of a roller 30 mounted on one end of a pivoted lever 32 having at its other end an operating key 34. The lever 32 is pivoted in lateral adjustably fixed position on a shaft 36 mounted on gage frame 10 so that roller 30 may be swung, by downward movement of said key 34, about said shaft 36 as an axis to cooperate with said rearwardly and outwardly displaced cam surface 22 to urge curved cam 20 in a sideways direction to open gage elements 6 and 8 into non-gaging position, such cam 20 being curved radially with respect to shaft 36 so that roller 30 will continue to contact a cam surface during its travel.

Shaft 36 (shown partly broken away) has a threaded end portion 38 fitting into a threaded bore 40 on one side of frame 10, its other end fitting into a smooth bore 42 on the opposite side of said frame so that the position of lever 32 with its roller 30 may be adjusted sideways by rotating shaft 36 through its adjusting slot 46.

Preferably, in order to lock gage elements 6 and 8 in non-gaging position, an additional cam surface 24 is provided on said cam 20, said additional surface being positioned rearwardly of cam surface 22 and extending slightly rearwardly and inwardly from the rearward end of said cam surface 22 to provide a lock by means of the spring tension of reeds 16, so that said gage elements 6 and 8 may be locked in non-gaging position by fully depressing key 34 to move roller 30 onto cam surface 24, and will be maintained in such position.

A vertically extending arm 26 is also provided on cam 20 to engage with the actuating stem 52 of a dial indicator 50 mounted on main frame 10 so that said dial indicator will be responsive to relative movement between subframe 11 and main frame 10. Release of the gage elements 6 and 8 may be readily accomplished by pressing operating key 34 upward until roller 30 passes forwardly and downwardly onto cam surface 22 and then clear of said cam surface, as reeds 16 (and the additional spring, if used) urge the gaging elements 6 and 8 together into gaging position.

According to this invention, a thread pitch diameter gage element for engaging at its pitch diameter a single thread groove of an externally threaded workpiece extends freely through a radial bore 54 in movable thread form gage element 8, said pitch diameter gage element having a generally rounded tip 56 of a predetermined radius for engaging the sides of a single thread groove at its pitch diameter and being mounted generally centrally of a lever arm 60 mounted by a vertically extending reed 62 on movable supporting member 14 for pivotal movement about an axis parallel to and displaced from the axis of the thread form gage elements 6 and 8. A tension spring 64 is provided between said arm and said supporting member to swing said arm and move said tip 56 into bore 54 and out of contact with the thread groove of a workpiece, all as hereinafter more fully explained.

In order to permit limited axial movement of the thread pitch diameter gage element tip 56 relative to thread form gage element 8 so that it can be displaced axially of said gage elements 6 and 8 sufficiently for engagement with a thread groove of an externally threaded workpiece, the thread pitch diameter gage element is provided with a flexible connecting portion 58 of reduced vertical cross-sectional dimension between said tip 56 and said lever arm 60. Thus, the tip 56 is free to move vertically to enter a workpiece thread groove, even though such groove be displaced vertically somewhat from the normal position of the tip 56, the bore 54 in movable thread form gage element 8 being of sufficient diameter to permit free vertical movement of said tip.

A thread pitch diameter indicating gage 70 is provided mounted on fixed frame 10, the actuating stem 72 of said gage contacting an upstanding web 66 on the free end of lever arm 60 spaced preferably at twice the distance from its pivot as is said pitch diameter gage element mounting so that the indicating gage 70 will indicate the true pitch diameter.

In order to avoid damage to the thread pitch diameter gage element tip 56, it has been found desirable to move said pitch diameter gage element radially outwardly with respect to said thread form gage element 8 when the thread form gage elements 6 and 8 are opened to non-gaging position. Accordingly, a spring-pressed cam element comprising a wire control cable is preferably used for such purpose. Such element has outer casing 80 mounted at its one end on said movable support member 14 and at its other end on main frame 10 adjacent the cam roller 30 so that its control wire 82 may be moved by contact of its end with said roller 30, when said roller is moved to its downward, forward gaging position, to compress spring 84 within the end of outer housing 86 mounted on movable support member 14 to urge lever arm 60 with its thread pitch diameter gage element into gaging position, said spring 84 when so compressed being sufficiently stronger than lever arm spring 64 to maintain said thread pitch diameter gage element tip 56 in contact with the thread groove of a workpiece.

When roller 30 is in non-gaging position against cam surface 24, control wire 82 is free to move so that its spring 84 is no longer under compression and lever arm 60 will then be pivoted by lever arm spring 64 to move said thread pitch diameter gage element radially outwardly of the thread and into bore 54 so that damage to its tip 56 will be prevented.

To use the gage of Figs. 1 through 3, it is first set in non-gaging position with cam roller 30 in contact with a cam surface 24 to lock the external gage elements in their open non-gaging position with reeds 16 substantially displaced from their neutral position with sub frame 11 in a position displaced to the left (Fig. 2) of main frame 10, and there positively maintain them. Simultaneously, control wire 82 will be released so that lever arm 60 will pivot under the influence of its spring 64 to move thread pitch diameter gage element tip 56 into its protected position within bore 54. Thus clearance is provided for the threads of a workpiece which may then be inserted into the gage elements 6 and 8.

With the workpiece in position, the gage may be released to closed gaging position by pressing upward on operating key 34. This will move roller 30 from the gage locking cam surface 24 onto cam surface 22 and then clear of such cam surface at the end of which travel it will engage the end of control wire 82, whereupon the gage elements 6 and 8 will move relatively toward one another and into closed gaging position in contact with the workpiece as urged by reeds 16 with the reeds slightly displaced from their neutral position with sub frame 11 in a position but slightly displaced to the left (Fig. 2) of main frame 10. Thus, the reeds 16 may provide the sole gaging pressure, being flexed into a position between their further displaced non-gaging position and their neutral position (if no additional spring be used) so that gage elements 6 and 8 remain positively maintained in gaging position. At the same time, the thread pitch diameter gage element tip 56 will move radially inwardly relatively to movable thread form gage element 8 out of its bore 54 and engage the sides of a workpiece thread groove at its pitch diameter. The thread form indicator actuating stem 52 will then be engaged with arm 26 on cam 20 of movable sub frame 11 to give a reading on thread form indicator 50, and the thread pitch diameter indicator actuating stem 72 will be engaged with web 66 on lever arm 60 to give a reading on pitch diameter indicator 70, it being assumed that both gages have been previously set to a standard plug. After the deviation from standard thread form diameter and pitch diameter has thus been determined, key 34 is pressed downwardly to move roller 30 rearwardly along cam surface 22 to urge cam 20 sideways to move the gaging elements 6 and 8 from gaging into non-gaging position and to release control wire 82 so that thread pitch diameter gage element tip 56 will be again moved into the protected position with bore 54, after which the workpiece may be removed.

Figure 4:
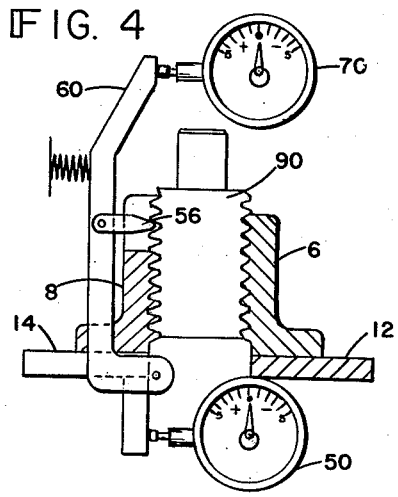
Figure 6:
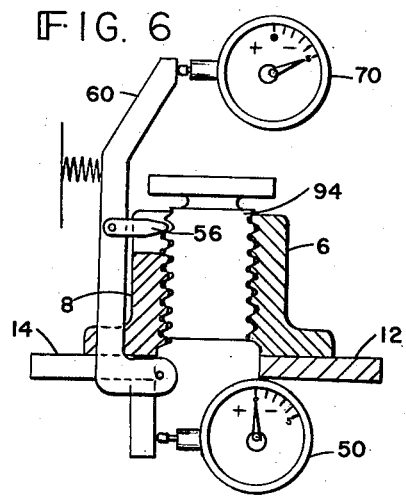
Figure 5:
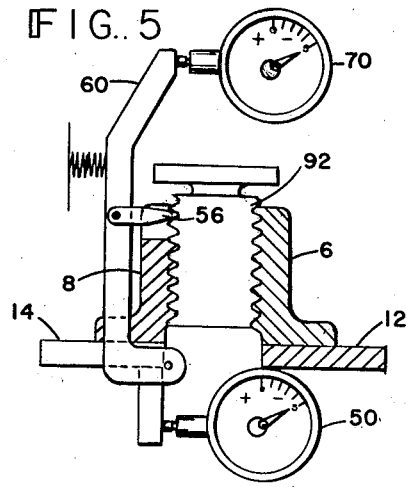
Figure 7:
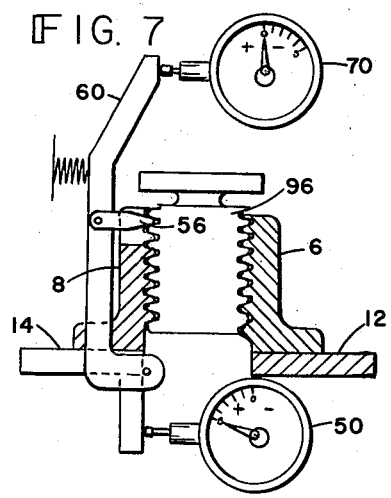

Referring now to Figs. 4 through 7, illustrating a variety of combinations of thread form and thread pitch diameter errors, in Fig. 4 is shown a standard plug 90 engaged by the thread form gage elements 6 and 8 and the thread pitch diameter gage element tip 56, such plug 90 by definition providing a zero error of both thread form and thread pitch diameter as shown on thread form dial indicator 50 and thread pitch diameter dial indicator 70. In Fig. 5 is shown a workpiece 92 having undersize pitch diameter but correct form and lead, this appearing by the identical readings on thread form indicator 50 and thread pitch diameter indicator 70. In Fig. 6 is shown a workpiece 94 with an undersize pitch diameter, but with thread form errors which cause it to appear of a correct size by reference only to the thread form indicator 50, the thread pitch diameter indicator 70 in this case showing the error in the part. In Fig. 7 is shown a workpiece 96 with a correct pitch diameter, but with thread form errors that cause the part to appear larger, as shown by the thread form indicator 50.

Thus it will be seen that the invention provides a surprisingly simple thread gage for simultaneous gaging of both the thread form and the thread pitch diameter of threaded workpieces. It will be apparent to those skilled in the gage art that various modifications may be made in the novel gage within the spirit of the invention and the scope of the appended claims.

I claim:

1. A thread gage comprising a pair of relatively oppositely movable thread form gage elements for gaging a threaded workpiece positioned therebetween and a thread pitch diameter gage element movable to and from gaging position relatively to the gaging surface of one of said form gage elements, said one form gage element supporting one side of said workpiece as a common reference both for said other form gage element and said pitch diameter gage element.

2. A thread gage comprising a pair of relatively oppositely movable thread form gage elements for gaging a threaded workpiece positioned therebetween and a thread pitch diameter gage element movable to and from gaging position in a direction radial to one of said gage elements, said one form gage element supporting one side of said workpiece as a common reference both for said other form gage element and said pitch diameter gage element.

3. A thread gage as claimed in claim 2, in which said thread pitch diameter gage element is further mounted for limited axial movement relative to said one thread form gage element.

4. A thread gage comprising a pair of gage element supporting members, means supporting one of said members for yielding substantially rectilinear motion relative to the other of said members, thread form gage elements mounted on each of said supporting members for movement with said members toward and away from one another to open and close said gage elements for gaging a threaded workpiece positioned therebetween, each of said thread form gage elements having a plurality of threads thereon for engagement with the threads of a workpiece, a thread pitch diameter gage element for engaging a single thread groove in a workpiece at its pitch diameter mounted for radial movement and limited axial movement relative to one of said thread form gage elements, said one form gage element supporting one side of said workpiece as a common reference both for said other form gage element and said pitch diameter gage element, thread pitch diameter indicating means responsive to radial displacement of said thread pitch diameter gage element relative to said one thread form gage element, and thread form indicating means responsive to the relative displacement of said thread form gage elements for simultaneously gaging the thread form and pitch diameter of said workpiece.

5. A thread gage comprising a pair of gage element supporting members, a pair of reeds arranged in parallel relation, one end of each of said reeds being secured to one end of each of said members, said reeds supporting one of said members for yielding substantially rectilinear motion relative to the other of said members, thread form gage elements mounted on each of said supporting members for movement with said members toward and away from one another to open and close said gage elements, each of said thread form gage elements having a plurality of threads thereon for engagement with the threads of a workpiece, a thread pitch diameter gage element for engaging a single thread groove in a workpiece at its pitch diameter mounted for radial movement and limited axial movement relative to one of said thread form gage element, means for radially displacing said thread pitch diameter gage element relative to said one thread form gage element, thread pitch diameter indicating means responsive to radial displacement of said thread pitch diameter gage element relative to said one thread form gage element, and thread form indicating means responsive to the relative displacement of said thread form gage elements.

6. A thread gage comprising a pair of gage element supporting members a pair of reeds arranged in parallel relation one end of each of said reeds being secured to one end of each of said members, said reeds supporting one of said members for yielding substantially rectilinear motion relative to the other of said members, thread form gage elements mounted on each of said supporting members for movement with said members toward and away from one another to open and close said gage elements, each of said thread form gage elements having a plurality of threads thereon for engagement with the threads of a workpiece, and one of said thread form gage elements having a radial bore therein, a thread pitch diameter gage element for engaging a single thread groove in a workpiece at its pitch diameter mounted for radial movement and limited axial movement in said bore of said one thread form gage element, means for radially displacing said thread pitch diameter gage element relative to said one thread form gage element, thread pitch diameter indicating means responsive to radial displacement of said thread pitch diameter gage element relative to said one thread form gage element, and thread form indicating means responsive to the relative displacement of said thread form gage elements.

7. An external thread gage comprising a pair of gage element supporting members, a pair of reeds arranged in parallel relation, one end of each of said reeds being secured to one end of each of said members, said reeds supporting one of said members for yielding substantially rectilinear motion relative to the other of said members, thread form gage elements mounted on each of said supporting members for movement with said members toward and away from one another to open and close said gage elements, each of said thread form gage elements having a plurality of internal threads thereon for engagement with the external threads of a workpiece, a thread pitch diameter gage element for engaging a single thread groove in a workpiece at its pitch diameter mounted for radial movement and limited axial movement relative to said one thread form gage element, means for radially displacing said thread pitch diameter gage element relative to said one thread form gage element, thread pitch diameter indicating means responsive to radial displacement of said thread pitch diameter gage element relative to said one thread form gage element, and thread form indicating means responsive to the relative displacement of said thread form gage elements.

8. An external thread gage as claimed in claim 6 in which said thread pitch diameter gage element is mounted on a lever arm for pivotal movement about an axis parallel to and displaced from the axis of said thread form gage elements, said lever arm being pivotally mounted on the gage element supporting member supporting said one thread form gage element.

9. An external thread gage as claimed in claim 7 in which said thread pitch diameter gage element includes a connecting portion flexible axially of said thread form gage elements to permit limited axial movement of said pitch diameter gage element for engagement with an external thread groove of a workpiece.

10. An external thread gage as claimed in claim 8 in which said means for displacing said thread pitch diameter gage element relative to said one thread form gage element includes means for pivoting said lever arm to move said thread pitch diameter gage element radially outwardly relative to said one thread form gage element when said thread form gage elements are opened to nongaging position.

11. An external thread gage comprising a pair of gage element supporting members, a pair of reeds arranged in parallel relation, one end of each of said reeds being secured to one end of each of said members, said reeds supporting one of said members for yielding substantially rectilinear motion relative to the other of said members, thread form gage elements mounted on each of said supporting members for movement with said members toward and away from one another to open and close said gage elements, each of said thread form gage elements having a plurality of internal threads thereon for engagement with the external threads of a workpiece, a thread pitch diameter gage element for engaging a single thread groove in a workpiece at its pitch diameter mounted for radial movement and limited axial movement relative to said one thread form gage element, means interposed between said supporting members for opening said thread form gage elements into non-gaging position and for displacing said thread pitch diameter gage element radially outwardly relative to said one thread form gage element as said thread form gage elements are opened to non-gaging position, thread pitch diameter indicating means responsive to radial displacement of said thread pitch diameter gage element relative to said one thread form gage element, and thread form indicating means responsive to the relative displacement of said thread form gage elements.

12. An external thread gage as claimed in claim 11 in which said means interposed between said supporting members includes a cam plate mounted on one of said supporting members, a cam follower mounted on the other of said supporting members for relatively opening said thread form gage elements into non-gaging position, and a cam element actuated by said cam follower for relatively moving said thread pitch diameter gage element outwardly relatively to said one thread form gage element.

13. An external thread gage as claimed in claim 11 in which said thread pitch diameter gage element is mounted on a lever arm for pivotal movement about an axis parallel to and displaced from the axis of said thread form gage elements, said lever arm being pivotally mounted on the gage element supporting member supporting said one thread form gage element and said cam element is mounted on said lever arm to pivot said lever arm to move said thread pitch diameter gage element relatively to said one thread form gage element.

References Cited in the file of this patent

UNITED STATES PATENTS

| | | |
|---|---|---|
| 1,547,514 | Mueller | July 28, 1925 |
| 2,367,255 | Aller et al. | Jan. 16, 1945 |
| 2,432,160 | Johnson | Dec. 9, 1947 |

FOREIGN PATENTS

| | | |
|---|---|---|
| 552,634 | Great Britain | Apr. 16, 1943 |